United States Patent [19]

Cole, Jr.

[11] Patent Number: 4,507,106
[45] Date of Patent: Mar. 26, 1985

[54] POWER TRANSMISSION CHAIN

[75] Inventor: Edward H. Cole, Jr., Ithaca, N.Y.

[73] Assignee: Borg-Warner Corporation, Chicago, Ill.

[21] Appl. No.: 442,386

[22] Filed: Nov. 17, 1982

[51] Int. Cl.³ .............................................. F16G 13/04
[52] U.S. Cl. .................................... 474/215; 474/245; 474/248; 474/238; 403/151
[58] Field of Search ............... 474/242, 244, 245, 248, 474/201, 215, 238, 240, 214, 216, 217; 403/150, 151, 153, 154, 155

[56] References Cited

U.S. PATENT DOCUMENTS

| | | | |
|---|---|---|---|
| 1,402,760 | 1/1922 | Hay | 474/219 |
| 3,016,755 | 1/1962 | Dittrich | 474/242 |
| 3,049,933 | 8/1962 | Besel | 474/242 |
| 3,540,302 | 11/1970 | Bendall | 474/229 |
| 3,742,776 | 7/1973 | Avramidis | 474/215 |
| 4,010,656 | 3/1977 | Jeffrey | 474/215 |
| 4,186,617 | 2/1980 | Avramidis et al. | 474/229 |
| 4,266,435 | 5/1981 | Bendall | 403/154 |
| 4,313,730 | 2/1982 | Cole, Jr. et al. | 474/201 |

FOREIGN PATENT DOCUMENTS 699494 12/1964 Canada .............................. 474/201

Primary Examiner—Stephen J. Novosad
Assistant Examiner—Mark J. Del Signore
Attorney, Agent, or Firm—Aubrey L. Burgess

[57] ABSTRACT

A rocker joint for a drive chain or a chain-belt comprising a pair of joint members of like cross-section and having front surfaces which rock or roll on one another. The joint members each have a front surface defined by a first radius and a back surface defined by a second and a third radius both progressively smaller than the first radius. A rocker joint pair of members fits into each group of aligned apertures in the interleaved sets of links to join the links and permit articulation of the chain. The link apertures are generally round and have a surface substantially engaged by a back surface of a pivot member.

13 Claims, 9 Drawing Figures

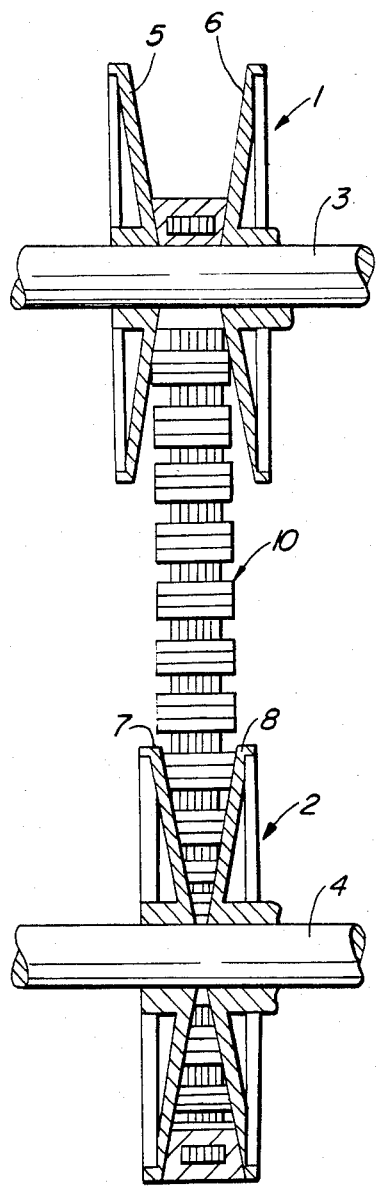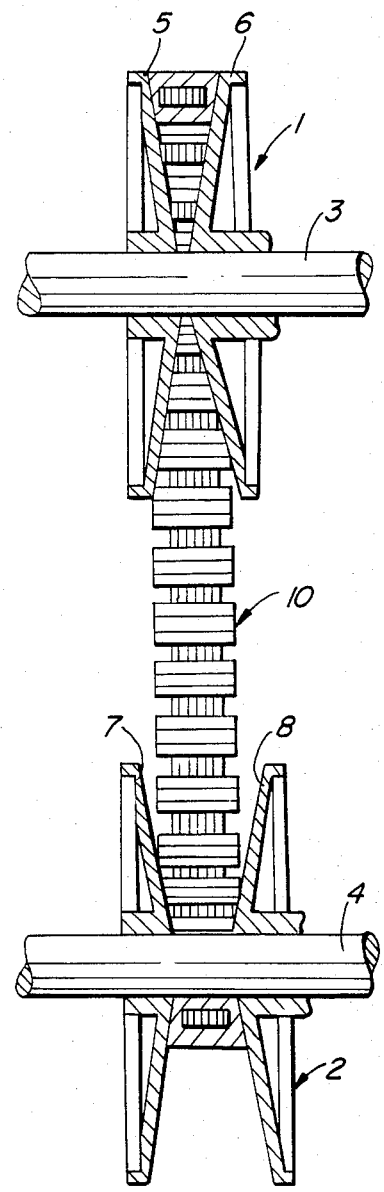

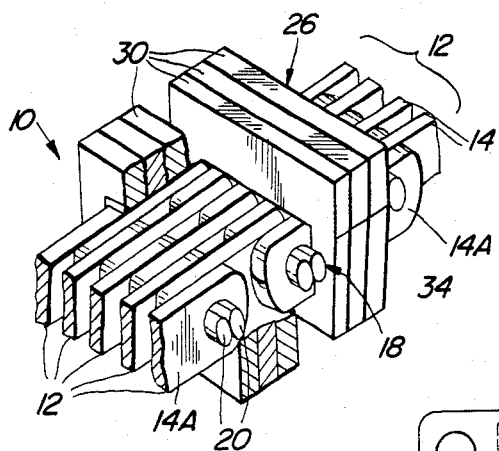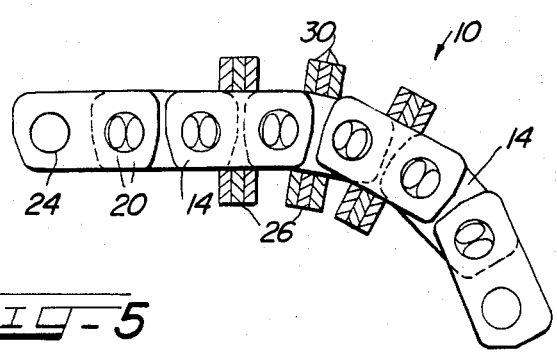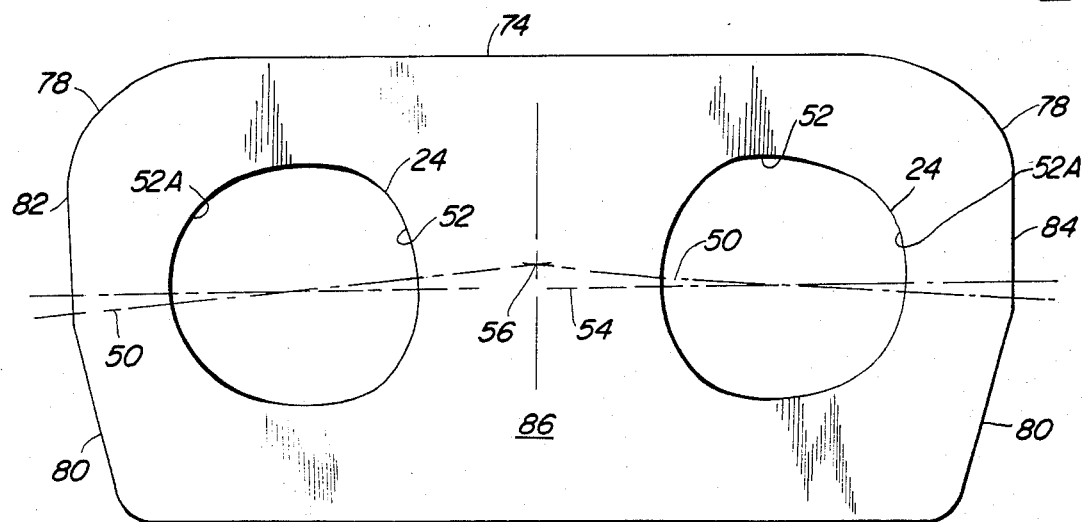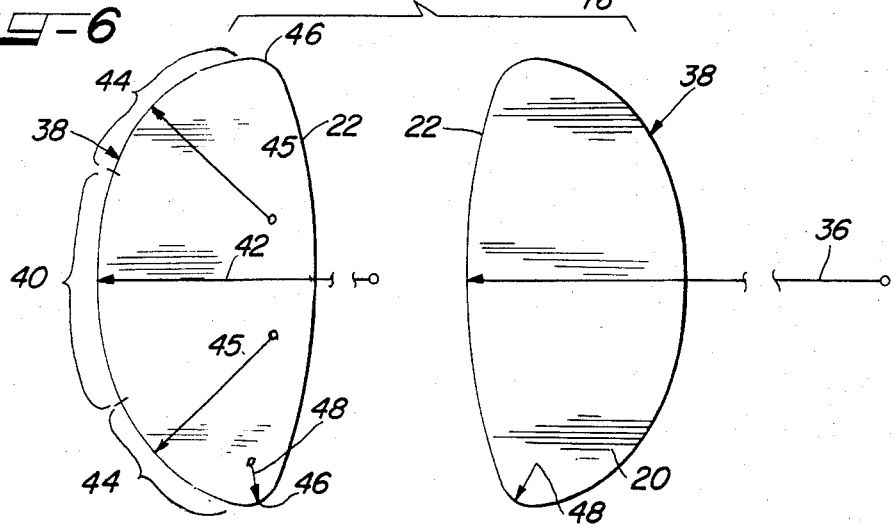

POWER TRANSMISSION CHAIN

BACKGROUND OF THE INVENTION

Power transmission chains comprising a plurality of sets of transversely aligned links which are interleaved with other sets of links are well known. Each link has a pair of spaced apertures, and the individual links are arranged into transversely aligned sets of links. One array of apertures of a first set of links is transversely aligned with an aperture array of the set of interleaved links, to thus define a group of aligned apertures. A pivot means is inserted in each group of transversely aligned apertures to join the interleaved sets of links and permit articulation of the assembly of links. The pivot means for joining the links can be single round pins, or what is known as rocker joints. Rocker joints comprise a pair of pins or a pin and a rocker, each having a surface in rocking engagement with the other. The links can be of the "silent" chain type having a pair of toes, or they can be similar to the roller chain type.

Chains of the type described are also used in the manufacture of chain-belts, i.e., a chain and load block combination, especially suitable to provide a driving connection between a pair of pulleys. Pulley transmissions providing a variable ratio drive are being tested for use in fuel efficient automobiles. Variable ratio pulley transmissions are also known as continuously variable transmissions or CVTs. In variable pulley transmissions, each pulley is constructed of a pair of flanges or sheaves, at least one of which is axially movable with respect to the other. A drive belt suitable for use in variable pulley transmissions is taught by U.S. Pat. No. 3,720,113. The belt is constructed of a plurality of superimposed and matched metal bands, and abutting drive or load blocks surround the bands. A belt so constructed is relatively expensive to manufacture because of the close tolerances required in the matching of the bands, and mounting of the load blocks so that each abuts the adjacent blocks.

Rocker joints are well known in the art. Some examples are illustrated in U.S. Pat. Nos. 3,540,302, 3,742,776 and 4,010,656. U.S. Pat. No. 3,540,302 shows a roller chain having a rocker joint comprising a pair of like members, and each member has a surface in rocking engagement with a like surface of the other member. The rocking surface of each is defined by a first radius, while the remainder of the member is defined by a surface of a second, and smaller, radius. Both surfaces of each member are convex. The apertures for receiving the joint members are generally rectangular, and each joint member has spaced notches in which the link members seat to transmit the working load to the assembly.

U.S. Pat. No. 3,742,776 discloses a silent chain with a rocker joint comprising a pair of like members, each having a rocking surface engaging the other. The rocking surfaces are defined by a first radius, while the back surfaces of each member are defined by a second, and smaller, radius. The rocking and back surfaces are joined by planar or straight surfaces. The links of the chain have apertures formed of inner and outer circular segments joined by wall segments which define straight chords of the circle. The members of the rocker joint are wedged into the apertures of a set of links, leaving a space between the back surface of the joint members and the walls of those apertures.

U.S. Pat. No. 4,010,656, which is owned by the assignee of the present invention, relates to a chain constructed of sets of interleaved links, each link having a pair of spaced, smooth walled, ovoid apertures. The rocker joint comprises a pair of members of like hypotrochoidal cross-sectional configuration. Each joint member has three convex surfaces of geneally equal size and of a first radius, joined by corner surfaces of a second and lesser radius. The elements substantially match the shape of parts of the apertures of a set of links, and engage those aperture parts with a pair of the convex surfaces and a joining corner surface.

In some forms of power transmission chains, one of the pivot members of a rocker joint is longer than the other. The shorter member is retained in position by guide links flanking the edges of the chain, and the longer of the pivot members is press-fit or otherwise secured in the guide links. In another form of chain, the pivot members or one of the members is press-fit into normal edge links.

The tensile strength of a chain with pivot elements press-fit into links is limited by the tensile strength of those links. Because of the press-fit of the pivot elements, the tensile strength of those links is usually less than the tensile strength of the other links in the chain. It has been suggested in an application for U.S. letters patent, Ser. No. 442,387, filed concurrently herewith, to use clip-like retaining members to position the pivot members, i.e., rocker joint members or round pins, in the links, so that the joint members need not be press-fit in some of the links. The use of the clip-like retaining members provides a chain having an improved tensile strength.

SUMMARY OF THE INVENTION

This invention comprises an improved rocker joint construction which is suitable for use in power transmission chains and/or chain-belts. The general construction of power transmission chains and/or chain-belts has been previously described as an assembly of links and pivot or point members.

The improved rocker joint of this invention comprises a pair of joint members having identical cross-sectional configurations. A pair of these joint members is recived in each group of transversely aligned apertures in the interleaved sets of links which make up the chain. The apertures are especially shaped to receive the joint members.

Each joint member has a front and a back convex surface. The front surfaces of a pair of joint members, when assembled with the links rock on one another. Each front surface is defined by a first, relatively large radius, and each back surface is defined by at least a centrally located second surface portion flanked by third surface portions, the radii of which are progressively smaller than the first, front surface radius. The front and back surfaces are joined by end surfaces having an even smaller radius than the third radius. Each pivot member back surface engages an aperture wall of all the links in one of the sets through which that pivot member passes.

BRIEF DESCRIPTION OF THE DRAWINGS

FIGS. 1 and 2 are illustrations of a variable ratio pulley transmission in two speed ratio positions, the pulleys of which are connected by a chain-belt comprising a chain constructed of links and joint members with load or drive blocks between the next adjacent joint members;

FIG. 3 is a partial perspective view of a portion of a power transmission chain-belt incorporating the rocker joint of this invention;

FIG. 4 is a side view of part of a chain-belt constructed according to this invention;

FIG. 5 is an elevation view of a link usable in the power transmission chain-belt of FIGS. 3 and 4, particularly illustrating the shape of the apertures for receiving the rocker joint members of this invention;

FIG. 6 is a cross-sectional view through a pair of joint members of this invention, particularly illustrating the radii defining the surfaces thereof;

DESCRIPTION OF THE PREFERRED EMBODIMENT

FIGS. 1 and 2 of the drawings illustrate a variable pulley transmission or CVT comprising a pair of spaced pulleys 1 and 2, mounted on shafts 3 and 4, respectively, and each pulley comprising a pair of flanges 5, 6 or 7, 8 drivingly connected by a chain-belt 10. One shaft is a drive shaft and the other is a driven shaft. Means (not shown or described) are provided to vary the spacing between the pulleys to thus vary the drive ratio of the transmission. At least one flange of each pulley is axially movable with respect to the other flange of the pulley. Such a chain-belt is one environment in which the present invention is useful.

Figure 7:
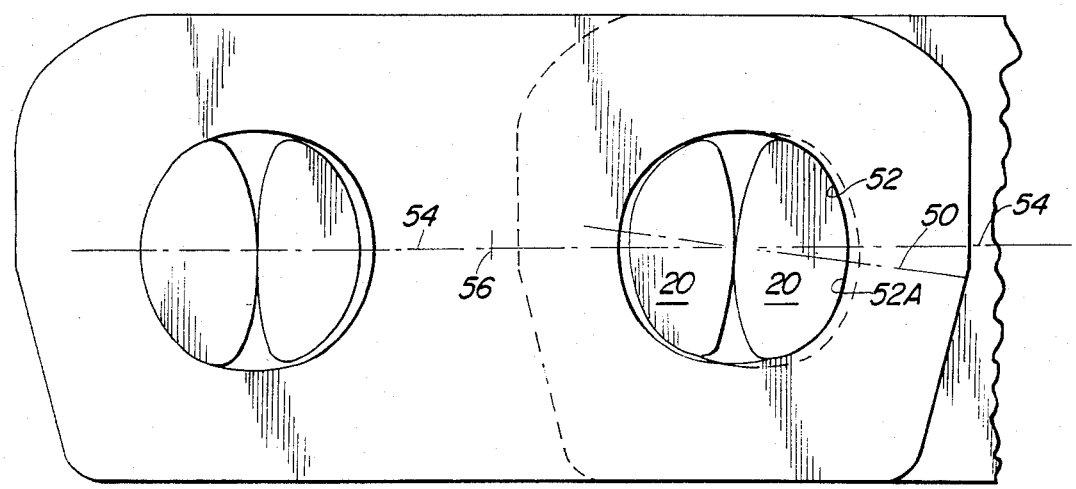
FIG. 7 is an enlarged, partial elevation view showing the rocker joint of this invention in a pair of aligned link apertures.
Figure 8:
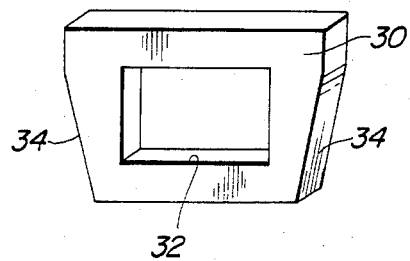
FIG. 8 is a perspective view of a load or drive block usable in the chain-belt of FIGS. 1 to 4.

FIGS. 3 and 4 of the drawings illustrate a power transmission chain-belt 10 using the rocker joint of this invention. The chain-belt 10 is constructed of sets 12 of metal links 14 interleaved with adjacent sets of the links, the adjacent pairs of link sets being joined by a rocker joint 18 comprising a pair of metal, generally D-shaped (in cross-section) members 20, 20. The members have facing front surfaces 22, as better shown in FIGS. 6 and 7, which surfaces can rock on one another when the members are received, as a pair, in a group of transversely aligned link apertures 24. Each link 14 has a pair of apertures 24 which are spaced from one another, as shown, for example, in FIG. 5. The distance between the centers of the apertures in one link is called the "pitch" of the links.

Chain-belt 10 also comprises metal load or drive blocks 26 encircling the chain and located between a pair of adjacent joints 18. Each load block 26 can be of one piece or constructed of a plurality of block parts 30, as desired. When the load blocks 26 are constructed of multiple parts, the parts can be die cut from sheet stock, and are thus relatively inexpensive to make and use. Each block regardless of whether it be of one piece or constructed of multiple parts is generally trapezoidal in shape when viewed from the front with a window 32 to receive the chain 10. Angled edges 34 are provided to frictionally contact the correspondingly tapered flanges of the pulleys, such as the pulleys illustrated in FIGS. 1 and 2.

In the construction illustrated in FIG. 3, members 20, 20 extend beyond the side edges of the outermost links 14A. Members 20, 20 can terminate at the outer surfaces of the outermost links or can be press-fit into suitable apertures in side links or in special links, such as guide links.

Members 20, 20 have the same cross-sectional shape and area. They can be cut from die formed stock. As particularly illustrated in FIG. 6, each member 20 has a cross-section defined by a plurality of convex surfaces. The front or rocking surface 22 of each member is defined by a relatively large radius 36. Back surface 38 of each member has a central surface part 40 defined by a radius 42 smaller than the radius 36, and surface parts 44, 44 flanking the surfaces part 40, each defined by a radius 45 smaller than the radius 36. The surface parts 44, 44 are each joined to front surface 22 by a connecting surface part 46, 46, each defined by a radius 48 smaller than the other radii. Thus each member 20 is defined, in cross-section, by six curvilinear surfaces of gradually decreasing radius. In order from the largest radius surface to the smallest, the surfaces include (1) a front surface 22, (2) a central back surface 40, (3) a pair of outer back surfaces 44, 44, one on either side of central back surface 40, and (4) a pair of connecting surfaces 46, 46, linking the front surface with the outer back surfaces.

A link 14 is illustrated in FIG. 5 and apertures 24 are particularly shown. Apertures 24, each of which is symmetrical about a line 50 extending in the direction of link length, can be described as generally round and defined by a continuous concave wall 52 of relatively large radius. There are no projections from or indentations in the wall 52 which could produce stress risers. Wall portion 52A of the apertures farthest from the link centers, corresponds generally to the shape of the back surface portion 44, 40, 44 of each joint member 20, so that each member is substantially engaged in the corresponding portion of the "back" aperture walls in a group of apertures. It is highly unlikely that a perfect registry of the member back (44, 40, 44) and aperture back wall 52A will be achieved because of manufacturing tolerances.

In a chain or chain-belt the back surface of one member 20 of a joint 18 substantially engages the back wall 52A of the apertures 24 of one set of links, while the other member of the joint substantially engages the back wall of apertures 24 in the other, interleaved set of links. The remainder of each aperture is slightly larger than the remainder of each joint member which permits one member of the joint to rock on the other member of the same joint. This spacing also permits the chain to articulate in use. The positions of a pair of members 20 in aligned link apertures 24 is particularly illustrated in FIG. 7. The lines 50 shown in FIG. 5 and in FIG. 7, i.e., the centerlines of each of the apertures 24 in the link 14, are angled with respect to a horizontal line 54 passing through and joining the centers of the apertures. The lines 50 join at a point on a vertical center line 56 (see FIG. 5) through the links. The lines 50, can, if desired, coincide with the line 54.

Figure 9:
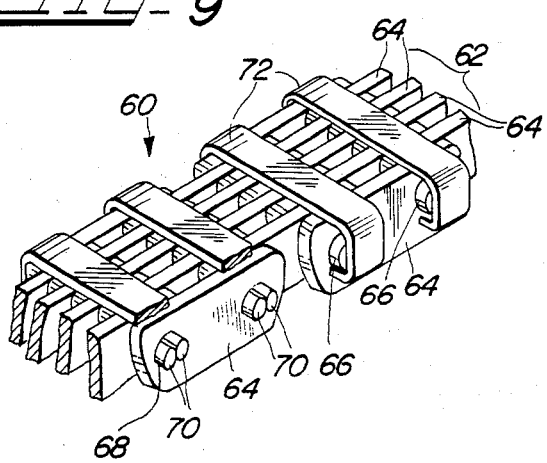
FIG. 9 is a perspective view of a portion of a power transmission chain using the joint of this invention and showing the use of retaining clips for retaining the rocker joint members in the assembly of links.

The rocker joint of this invention is also usable in a power transmission chain 60 as illustrated in FIG. 9. Chain 60 comprises sets 62 of links 64 interleaved with adjacent sets 62 of the links, the links each having a pair of spaced openings or apertures 66. Openings 66 in one set of links are aligned with openings 66 in another set of links to form groups of aligned openings, each group to receive joint members 68 according to this invention. Apertures 66 are like those described in connection with FIG. 5 and the joint members each comprise a pair of members 70, 70, which are identical to the members 20, 20. Here, retaining clips 72 retain members 70, 70 in the assembly of links. Retaining clips similar to these can be used in the FIG. 3 embodiment, if desired.

It is understood that the joint construction of this invention can be used with many different link forms, so long as the shapes of the members and their receiving link apertures are as described herein. For example, the links can be of the toed "silent" chain variety or similar to American Standard or British Standard roller chain varieties or other shapes, as desired. Examples of chains constructed of toed links in which the rocker joint of this invention can be used are described and illustrated in U.S. Pat. No. 4,342,560, issued Aug. 3, 1982, and assigned to the assignee of this application. The rocker joint members of this invention can be retained in their operating positions by being press-fit or otherwise secured to some links. The rocker joint members can be of different length for use with some forms of guide links; or by utilizing the invention disclosed and claimed in the aforesaid co-pending application.

The particular link form illustrated in FIG. 5, however has certain advantages in that the width of material flanking the apertures at the ends of the link is maximized to substantially eliminate areas of potential failure. The link has generally straight, parallel top and bottom surfaces 74, 76 joined by end surfaces having an upper curved part 78 and a lower angled part 80. The straight parts 82 and 84 between the curved parts 78 and the angled parts 80 together with the central web part 86 provides a maximum center section which resists a tendency to neck-down when a tensile load is applied to the chain or chain-belt, as the case may be. The angled shape of the ends, such as at 80, 80 permits the chain to articulate during its use.

One of the major advantages of the joint construction of this invention is in the tensile strength of the resulting assembled chain. Rocker joint chains, in the past, have been inherently weaker than round pin chains where the joint members have substantially the same cross-sectional area. The joint of this invention contributes to a chain tensile strength which approaches the strength of a chain which utilizes a round pin joint of substantially the same cross-sectional area. A rocker joint provides a better wearability of the chain than do round pin joints, and a rocker joint chain can operate at higher speeds than a round pin joint chain. Additionally, for a given pitch link (pitch being the distance between centers of the link apertures) and with a given link aperture radius for a round pin joint, the link apertures of this invention have radii not less than that given radii (and some radii equal to that given radii). The apertures can then receive a rocker joint of two parts with a total cross-sectional area approximately equal to that of a round pin for the aperture size without affecting the strength of the links. The links are so constructed as to have the maximum material around the apertures while permitting articulation of the chain.

I claim:

1. A rocker joint for a chain constructed of an assembly of links and pivot members, which chain comprises a plurality of sets of links interleaved with other sets of links, each link having a pair of generally round, spaced apertures each of which is defined by a continuous concave wall, a part of which defines a back wall, one set of apertures of one link set being transversely aligned with one set of apertures of the next adjacent link set which is interleaved therewith to form groups of aligned apertures, a pair of pivot members in each group of aligned apertures to both join the link sets and permit articulation of the chain, each pivot member having a continuous convex front surface and a continuous convex back surface, the front surfaces of each pair opposing and rocking on one another and being defined by a first radius, the back surfaces being defined by a second and third radii both of which are smaller than the first radius, said back surface having other portions each defined by said third radius joined to the front surface by connecting surfaces, each connecting surface having a radius smaller than any radius of the member back surface, each member back surface having a shape substantially matching that of said back wall of said aperture and substantially engaging a back wall of each aperture in one set of the interleaved links and being free of engagement with a back wall of each aperture in the other set of interleaved links through which said pair of pivot members extend.

2. A power transmission chain constructed of an assembly of links and pivot members in which a plurality of sets of links are interleaved with other sets of links, each link having a pair of generally round, spaced apertures each of which is defined by a continuous concave wall, a part of which defines a back wall, the apertures of one set of links being transversely alinged with the apertures of the next adjacent set of links which is interleaved therewith to form groups of aligned apertures, a pair of pivot members in each group of aligned apertures to both join the link sets and permit articulation of the chain, each pivot member having a continuous convex front surface and a continuous convex back surface, the front surfaces of each member pair opposing and rocking on one another and being defined by a first radius, the center back surface being defined by a second radius and the outer back surfaces being defined by a third radius, both the second and third radius being smaller than the first radius, said outer back surfaces being joined to the front surface by a pair of connecting surfaces, each having a radius smaller than any radius of the back surface, each back surface of the pivot members having a shape substantially matching that of a portion of said wall of said aperture and substantially engaging said back wall of each link aperture in one of interleaved links and being free of engagement with another portion of the wall of each aperture in the other set of interleaved links through which the same member pair extend, the apertures being so shaped to provide clearance for the pivot members as the chain articulates.

3. A power transmission chain as recited in claim 2, in which each aperture in each link is symmetrical about a center line.

4. A power transmission chain as recited in claim 3, in which each aperture center line is angled with respect to a line joining the centers of each aperture in each link.

5. A power transmission chain-belt for use with a pulley transmission and constructed of an assembly of links and pivot members, which chain-belt comprises a plurality of sets of links interleaved with other sets of links, each link having a pair of generally round, spaced apertures each of which defines a back surface wall defined by a continuous concave surface, one set of apertures of one link set being transversely aligned with one set of apertures of the next adjacent interleaved link set to form groups of aligned apertures, a pair of pivot members in each group of aligned apertures to both join the link sets and permit articulation of the chain, each pivot member having a continuous convex front surface and a continuous convex back surface, the front surfaces of each pair opposing and rocking on one another and being defined by a first radius, the back surface being defined by a second and third radii both of which are smaller than the first radius, said back surface having outer portions each defined by said third radius joined to the front surface by connecting surfaces, each connecting surface having a radius smaller than any radius of the back member surface, each member back surface having a shape substantially matching and engaging said back surface wall of each aperture in one set of the interleaved links and being free of engagement with a back surface wall of each aperture in the other set of interleaved links through which said pair of pivot members extend, the apertures being so shaped to provide clearance for the pivot members as the chain articulates, and a plurality of generally trapezoidal load blocks on said chain, said load blocks being located between pivot members and having edges shaped to frictionally engage the pulleys of the transmission.

6. A power transmission chain-belt as recited in claim 5, further comprising retaining means for enclosing the ends of at least one of said pivot means to thus retain said one of said pivot members in a group of apertures.

7. A power transmission chain-belt as recited in claim 5, wherein said retaining means comprises generally C-shaped clips which traverse the chain-belt and engage a part of the chain.

8. A power transmission chain-belt constructed of an assembly of links and pivot members in which a plurality of sets of links are interleaved with other sets of links, each link having a pair of generally round, spaced apertures, each of which has a back wall, the apertures of one set of links being transversely aligned with the apertures of the next adjacent interleaved set of links to form groups of aligned apertures to both join the link sets and permit articulation of the chain, each pivot member having a convex front and a convex back surface, the front surfaces of each member pair opposing and rocking on one another and being defined by a first radius, the center back surface being defind by a second radius and the outer surfaces being defined by a third radius, both the second and third radius being smaller than the first radius, said outer back surfaces being joined to the front surface by a pair of connecting surfaces, each having a radius smaller than any radius of the back surface, each back surface of the pivot members substantially engaging a back wall of each link aperture in one of interleaved links and being free of engagement with a back wall of each aperture in the other set of interleaved links through which the same member pair extend, the apertures being so shaped to provide clearance for the pivot members as the chain articulates, at least one drive block positioned around the chain for engaging drive means and located between adjacent pivot members, retaining means engaging a part of said chain for positioning at least one pivot member in a group of apertures, said drive blocks restricting longitudinal movement of each of said retaining means.

9. A power transmission chain comprising sets of links interleaved with other sets of links and each link having a pair of spaced apertures, each aperture being located adjacent to an end of the link, one set of apertures in one link set being transversely aligned with one set of apertures in the next adjacent link set which is interleaved therewith to form groups of apertures, and a rocker joint received in each group of aligned apertures to interconnect said adjacent sets of links and to permit articulation of the chain, each aperture of each line being generally round and having a smooth, concave defining wall with parts of said wall having radii larger than other parts of said wall, the larger radii being located generally centrally of the links, each rocker joint comprising a pair of members defined by a continuous front surface, a continuous back surface and connecting surfaces, said front surface of each member being defined by a first radius, said back surface of each member being defined by a generally centrally located portion having a second radius and outer portions joined to said centrally located portion each defined by a third radius, both said second and third radii being smaller than said first radius, said connecting surfaces joining said front and back surfaces and being defined by an even smaller radius, the front surfaces of each member of a pair of members being in rocking contact with one another and the back surface of each member having a shape substantially matching that of a part of said aperture defining wall and being in substantial contact with that part of the defining wall of an aperture.

10. A power transmission chain as recited in claim 9, in which said other parts of each aperture wall are similar in shape to the back surface of each of said members.

11. A power transmission chain as recited in claim 10, in which each aperture is symmetrical about a line extending in the direction of link length and passing through a center of the aperture.

12. A rocker joint and link combination for a power transmission chain constructed of a plurality of transversely arranged link sets interleaved with adjacent link sets, each link having a pair of spaced, specially shaped apertures, the apertures of one link set being transversely aligned with one set of apertures of the next adjacent link which is interleaved therewith to form groups of apertures to receive rocker joint members which connect the adjacent interleaved sets together and permit articulation of the chain, the improvement comprising:

links having substantially straight top and bottom defining surfaces joined by end surfaces having a curved upper surface and an angled lower surface, each link having a pair of spaced and generally round, smooth walled apertures defined by a continuous concave surface, a pair of rocker joint members having like cross-sections, and members having continuous front surfaces defined by a first radius, and continuous back surfaces defined by a centrally located part and outside parts flanking said centrally located part, said centrally located part being defined by a second radius and said flanking parts being each defined by a third radius, said first, second and third radii being progressively smaller, and said flanking surfaces being joined to said front surface by curved connecting surfaces, each defined by an even smaller radii that the radii of the other defining surfaces, said front surfaces rocking on one another, said apertures each having a wall portion corresponding generally to the back surface of said joint members, said apertures wall portions being located adjacent the end surfaces thereof and being engaged by a back surface of a joint member.

13. A pivot member for use only in a power transmission chain which is constructed of an assembly of interleaved sets of links joined together, said pivot member having continuous front and back surfaces, said front surface being defined by a first radius, said back surface being defined by a central surface and outside surfaces flanking said central surfaces, said central and outside surfaces being of progressively smaller radii than the radius of said front surface, and connecting surfaces joining said front and back outside surfaces, said connecting surfaces being each defined by an even smaller radius than the radii of the other defining surfaces.

* * * * *

UNITED STATES PATENT AND TRADEMARK OFFICE
CERTIFICATE OF CORRECTION

PATENT NO. : 4,507,106
DATED : March 26, 1985
INVENTOR(S) : Edward H. Cole Jr.

It is certified that error appears in the above—identified patent and that said Letters Patent is hereby corrected as shown below:

Column 6, line 29, cancel "alinged" and insert -- aligned --.

Column 7, line 47, after "outer" insert -- back --.

Column 8, line 7, cancel "line" and insert -- link --.

Signed and Sealed this

Thirteenth Day of August 1985

[SEAL]

Attest:

DONALD J. QUIGG

Attesting Officer    Acting Commissioner of Patents and Trademarks